United States Patent Office 3,515,585 Patented June 2, 1970

3,515,585

GELATION COATING METHOD FOR ELECTRONIC CIRCUIT PANELS

John B. Chamberlin, Fishkill, N.Y., and Richard W. Noth, Essex Junction, Vt., assignors to International Business Machines Corporation, Armonk, N.Y., a corporation of New York No Drawing. Filed Apr. 24, 1968, Ser. No. 723,928
Int. Cl. H05k *3/28*
U.S. Cl. 117—212 4 Claims

ABSTRACT OF THE DISCLOSURE

A process for obtaining a conformal polyimide coating upon an electronic circuit panel comprising the steps of covering the panel with the polyimide solution, gelating said solution by contact with a gelating solvent, removing excess solution by agitating said panel while in contact with said gelating solvent so as to leave a thin conformal film upon said panel, and curing said film by heating. Films of a thickness of 5–9 microns may be so deposited.

FIELD OF THE INVENTION

Coating processes comprising the steps of spraying, dipping, immersing, etc., the object to be coated with a coating substance, removing any excess coating substance, and setting said coating substance by use of a heating step.

PRIOR ART

Processes for applying protective coating to electronic circuit panels are well known in the prior art. Such coatings, in general, are of a resinous or plastic substance. Such a substance is most easily applied by dipping the circuit panel in an uncured solution of resin, and then spinning the circuit panel to uniformly distribute the resin, and to remove any excess material, and then curing the resin. Conversely, the electronic circuit panel may have the coating applied to it while the circuit panel is spinning, achieving much the same effect. This particular method has problems in that centrifugal forces are set up which may tend to dislodge the components mounted upon the circuit panel. Similarly, there is a tendency to build up excess coating upon sharp edges of the circuit panel, and upon objects upon the circuit panel.

Other coating methods include dipping of the circuit panel into the coating substance, and draining off the excess. Alternatively, the coating substance may be sprayed directly upon the circuit panel. Problems arise with both of these methods. The spraying method may not adequately coat the circuit panel where components are mounted upon the circuit panel as the spray may not get under or about the mounted components. Similarly, there may be nonuniformity in the spraying method. Uniform coatings by this method are difficult. As to dipping, if a very thin solution of resin is utilized, uneven coating may occur, as well as too thin a coating. Conversely, if a thick coating is utilized, this coating may not fully flow under and about mounted components on the circuit panel, resulting in areas that are uncoated.

In general, whichever method is utilized, the resin solution is generally cured by a heating step which drives off solvent, and polymerizes the coating, allowing the coating to be to some extent impervious to chemical substances, and particularly to moisture. The heat step also aids in flow of the coating upon the substrate, to be a conformal coating.

Of these known methods, spraying and dipping are the least popular, as they are least likely to produce the most uniform and most conformal protective coating. The combination of dipping plus spinning, or spinning during which time the coating is applied, is the method most commonly used. The problems involved here include the inability to obtain relatively thick coatings, which have greater assurity of uniformity than very thin coatings; and the possibility of dislodging components mounted upon the circuit panel by the forces set up during the spinning operation. Similarly, for production methods, such a spinning technique that requires individual mounting of the circuit panel is not particularly desirable.

Thus, it is an object of this invention to allow circuit panels to be coated with a plastic substance so as to form a conformal coating, in an improved manner.

Another object of this invention is to minimize the probability of damage to components upon a circuit panel by minimizing the amount of agitation the circuit panel must encounter in having a coating applied to it.

Still another object of this invention is to allow mass production coating techniques in an inexpensive manner.

Still another object of this invention is to allow highly stable AI polyimide films to be applied to an electronic circuit panel in a simple manner.

SUMMARY OF THE INVENTION

These and other objects are met by the coating process of this invention. This process briefly comprises covering the substrate to be coated with a solution of an AI polyimide material; gelating said solution by contacting said solution with a solvent such as benzyl alcohol; agitating said substrate while in contact with said solvent, whereby excess gelated solution is removed from the substrate leaving a thin conformal film upon said substrate; and curing by heat said film to form a conformal, impervious polyimide film upon said substrate. Typically, said substrate is an electronic circuit panel, and more particularly, a panel of the type known as a solid logic technology module. These and other objects of the invention will become apparent from the general description that follows.

GENERAL DESCRIPTION

Electronic circuit panels generally have mounted upon them circuit components such as transistors, condensers, diodes, etc. These components are generally of a relatively fragile nature. In a particular type of electronic circuit panel, known as a solid logic technology module (SLT module), small semiconductor chips which comprise the diode or transistor or other active element are mounted upon the surface of a ceramic substrate. These semiconductor chips are very small, on the order of, for example, .030″ square, and very thin, on the order of, for example, .010″ thick. Consequently, these components are very fragile.

After mounting these components upon an SLT module, for example, it is desired to protect these components and the associated circuitry on the module from corrosive attack as well as from mishandling, which could destroy the electrical contacts or the device or module itself. A common method of doing this is to protect the module by coating those surfaces of the module having the active components thereon. To assure good coating, it is necessary that the active elements as well as the module itself be completely encapsulated on its active areas with the coating material. Spin coating often does a great deal of damage to the module in the manner of loosening or otherwise affecting the active components thereon.

We have found a particular method of applying a polyimide coating to such SLT modules and circuit panels in general that alleviated this problem. Polyamide-polyimide materials, are temperature stable, and impervious to chemical attack by most chemicals. They are further very moisture resistant. Such materials then are highly desirable as coating substances. One such polyamide-polyimide material is commonly known as AI polyimide, which is a product of Amoco Chemical Corporation, and is the material used in this invention.

We have found such a coating can be applied in the following manner to meet the objects of this invention, that is a temperature stable coating that may be applied in a production process and that solves the problems normally encountered by spin coating techniques. Further, while this coating is thin enough to be conformal, it is not so thin as to be unreliable.

This method consists essentially of dissolving in DMAC (di-methyl-acidamide) solvent between 15–25 weight percent AI polyimide powder. Of course, a solid chunk could be dissolved in the solvent, but at the expense of a greater amount of time of dissolution. While this range of 15–25% powder is acceptable, we prefer to use a composition of 20% by weight of solid AI polyimide powder dissolved in DMAC. This corresponds to a Brookfield viscometer RVT Scale reading of between 90–120 and is our preferred starting composition. This material has a honey-like consistency and is amber in color.

When working with an SLT module, we must protect the contact pins on such SLT module by masking the pins by plugging the module into a holder, or by any other masking means. The substrate is then dipped in this solution to cover the area desired to be coated. Of course, the entire module may be so coated, or just those parts of the module, circuit panel, or any other surface it is desired to coat on an electronic module or any surface in general. The area coated is considered to be the substrate, for ease of definition. After dipping, the excess is allowed to drain off. Any bubbles that may accumulate under an active element on an SLT module, for example, tend to ride out with the solution being drained. A film perhaps .015–.020" thick now remains on the substrate.

While the prior art at this point spins the module to uniformly distribute the coating material and to relieve fillets under such elements as the chips, this is exactly the point where most damage occurs. Thus, to relieve fillets without the effect of spin coating, the module is now dipped in a solvent that will cause gelation of the film. The gelating solvent should have the property of causing the coating to swell, but should not dissolve the coating, and should thus allow by agitation in the solvent the excess of the coating solution to be removed from the substrate by floating away such excess as strands or globs. Such a solvent is benzyl alcohol as a preferred embodiment, but may also be dioxane or cyclohexanone.

Not all of the solution is removed by the gelating solvent, just the excess. A thin coating remains upon the substrate. This coating appears as a milky-translucent-transparent-clouded type of film.

This film is then cured by use of heat. The curing removes the solvents from the film, causes densification of the film, and results in a tack free film of uniform color. In the case of the AI polyimide above, the film assumes an amber color after cure, whereas before cure said film was milky in color. This change in color is also an indication that the curing cycle is completed.

Typically, such a curing cycle may be 1 hour at 100° C., followed by an hour at 150° C., followed by 3 hours at 175° C. As a variation, and in the preferred embodiment, we use a cure of 3 hours at 100° C.

The final coating now remaining upon the substrate has a thickness of between 5 and 9 microns, as opposed to a normal thin coating of between 2 and 4 microns. This coating, of an AI polyimide material, is moisture proof, adds strength to the binding of the active elements to the module, reduces dust abrasion, and is generally chemically resistant. This chemical resistance is most important when it is desired to cool such an array of electronic modules by liquid cooling means.

Thus, briefly stated, our coating method comprises making a polyamide-polyimide solution by dissolving AI polyimide resin in DMAC solvent; dipping the substrate into this solution and letting the excess drain; contacting the solution with a gelating solvent, and agitating the substrate while in contact with such gelating solvent to remove excess coating to leave a thin milky film upon the substrate, and then curing the film to form the final conformal coating by use of heat for given periods of time.

While the coating process has been described particularly in relation to electronic circuit modules, it is clear that wherever a polyimide film is desired upon any object in general, such a process as that which we have disclosed may be utilized. Further, while for simplicity, the term substrate has been utilized, such a term is to be interpreted to mean the area it is desired to coat, which may be less than the entire surface area of an object.

Such a substrate, aside from electronic circuit modules, may also constitute a wire mesh, or wire upon which it is desired to place an insulating or protective coating. A wire mesh having wires separated by .050" distance can be coated by this method, without filling or bridging the openings in the mesh. By other methods, this extremely difficult if not impossible, to achieve.

Delicate electrical windings may also be coated by the method of this invention, as little jarring or agitating is needed.

While the invention has been particularly shown and described with reference to a preferred embodiment thereof, it will be understood by those skilled in the art that various changes in form and detail may be made therein without departing from the spirit and scope of the invention.

What is claimed is:

1. A process for obtaining a thin, conformal coating upon an electronic circuit panel comprising the steps of:
covering an electronic circuit panel with a solution of substantially 15–25% by weight polyamide-polyimide material dissolved in di-methyl-acidamide by contacting said panel with said solution;
gelating said solution upon said panel by contacting said solution with a solvent of the group consisting of benzyl alcohol, dioxane, and cyclohexanone;
agitating said panel while contacting said solution with said solvent to remove the excess of said gelated solution to leave a thin gelated film upon said panel, covering said panel in a conformal manner;
curing said thin gelated film upon said panel by heating said film at a temperature and for a time sufficient to drive off said solvent and to cause said film to be tack free, whereby a conformal coating is placed upon said panel.

2. The process of claim 1 wherein said solution comprises substantially 20% by weight polyamide-polyimide material dissolved in di-methyl-acidamide.

3. The process of claim 1 wherein said curing step comprises heating said gelated film upon said panel for a time of substantially three hours at a temperature of substantially 100° C.

4. The process of claim 1 wherein said curing step comprises heating said thin gelated film upon said panel for one hour at 100° C., then for one hour at 150° C., and then for three hours at 175° C.

References Cited

UNITED STATES PATENTS

| | | | |
|---|---|---|---|
| 2,661,307 | 12/1953 | Foster | 117—49 |
| 3,071,496 | 1/1963 | Fromm et al. | 117—218 |
| 3,168,417 | 2/1965 | Smith et al. | 117—218 X |
| 3,309,578 | 3/1967 | Diebold | 117—218 X |

ALFRED L. LEAVITT, Primary Examiner

J. R. BATTEN, JR., Assistant Examiner

U.S. Cl. X.R.

29—627; 117—63, 99, 102, 119.6, 128.4, 218